(12) United States Patent
Ryu et al.

(10) Patent No.: US 11,490,395 B2
(45) Date of Patent: Nov. 1, 2022

(54) FEEDBACK-DRIVEN ANTENNA ARRAY SIZE ADAPTATION

(71) Applicant: QUALCOMM Incorporated, San Diego, CA (US)

(72) Inventors: Jung Ryu, Fort Lee, NJ (US); Vasanthan Raghavan, West Windsor Township, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 16/249,419

(22) Filed: Jan. 16, 2019

(65) Prior Publication Data

US 2019/0239233 A1 Aug. 1, 2019

Related U.S. Application Data

(60) Provisional application No. 62/623,291, filed on Jan. 29, 2018.

(51) Int. Cl.
*H04W 72/08* (2009.01)
*H01Q 3/00* (2006.01)
(Continued)

(52) U.S. Cl.
CPC .......... *H04W 72/082* (2013.01); *H01Q 3/005* (2013.01); *H04B 7/0408* (2013.01);
(Continued)

(58) Field of Classification Search
CPC .......... H04W 72/082; H04W 72/0413; H04W 72/046; H01Q 3/005; H01Q 3/2605;
(Continued)

(56) References Cited

U.S. PATENT DOCUMENTS

| 2003/0128658 A1* | 7/2003 | Walton | H04L 5/0023 370/208 |
| 2008/0108310 A1* | 5/2008 | Tong | H04W 72/042 455/69 |
| 2010/0027696 A1* | 2/2010 | Lee | H04L 1/0026 375/260 |
| 2011/0033015 A1* | 2/2011 | Park | H04B 7/084 375/347 |

(Continued)

FOREIGN PATENT DOCUMENTS

CN 104113366 A 10/2014

OTHER PUBLICATIONS

International Search Report and Written Opinion—PCT/US2019/014002—ISA/EPO—dated Apr. 17, 2019.

*Primary Examiner* — Kwang B Yao
*Assistant Examiner* — Xuan Lu
(74) *Attorney, Agent, or Firm* — Arent Fox, LLP

(57) ABSTRACT

A method and apparatus for antenna-array size adaptation at a BS include performing an initial beam refinement procedure using a plurality of antenna arrays with one or more devices, transmitting a plurality of beams using a plurality of antenna configurations to the one or more devices as part of an enhanced beam training procedure, wherein each antenna configuration includes a different subset of the plurality of antenna arrays used to transmit a different beam of the plurality of beams, receiving a plurality of feedback messages from the one or more devices associated with the plurality of beams transmitted using the plurality of antenna configurations, selecting an antenna configuration including a subset of the plurality of antenna arrays based on the plurality of feedback messages from the one or more devices, and communicating with the one or more devices using the selected subset of the plurality of antenna arrays.

34 Claims, 8 Drawing Sheets

(51) Int. Cl.
*H04B 7/0408* (2017.01)
*H04B 7/06* (2006.01)
*H04W 72/04* (2009.01)
*H01Q 3/26* (2006.01)
*H04B 7/0417* (2017.01)

(52) U.S. Cl.
CPC ........... *H04B 7/063* (2013.01); *H04B 7/0691* (2013.01); *H04B 7/0695* (2013.01); *H04W 72/046* (2013.01); *H04W 72/0413* (2013.01); *H01Q 3/2605* (2013.01); *H04B 7/0417* (2013.01); *H04B 7/0623* (2013.01)

(58) Field of Classification Search
CPC .... H04B 7/0408; H04B 7/063; H04B 7/0691; H04B 7/0695; H04B 7/0417; H04B 7/0623
USPC .......................................................... 370/329
See application file for complete search history.

(56) References Cited

U.S. PATENT DOCUMENTS

| | | | |
|---|---|---|---|
| 2013/0077580 A1* | 3/2013 | Kang | H04B 7/061 370/329 |
| 2016/0065290 A1* | 3/2016 | Zhu | H04W 76/14 370/329 |
| 2016/0119043 A1* | 4/2016 | Rajagopal | H04B 7/086 370/329 |
| 2016/0344464 A1* | 11/2016 | Kim | H04B 7/0617 |
| 2016/0359538 A1 | 12/2016 | Onggosanusi et al. | |
| 2017/0201892 A1 | 7/2017 | Wen et al. | |
| 2017/0207845 A1* | 7/2017 | Moon | H04B 7/0695 |
| 2017/0279507 A1 | 9/2017 | Kim et al. | |
| 2017/0303263 A1* | 10/2017 | Islam | H04W 16/28 |
| 2018/0035438 A1* | 2/2018 | Pao | H04W 72/0413 |
| 2019/0173562 A1* | 6/2019 | Yu | H04W 72/042 |
| 2019/0222279 A1* | 7/2019 | Xi | H04W 72/00 |

\* cited by examiner

FEEDBACK-DRIVEN ANTENNA ARRAY SIZE ADAPTATION

CROSS REFERENCE TO RELATED APPLICATIONS

The current application claims priority to U.S. Provisional Patent Application No. 62/623,291 entitled "Feedback-Driven Antenna Array Size Adaptation," filed on Jan. 29, 2018, the content of which is incorporated by reference in its entirety.

BACKGROUND

The present disclosure relates to wireless communications, and more particularly, to apparatus and methods of feedback-driven antenna array size adaptation.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

These multiple access technologies have been adopted in various telecommunication standards to provide a common protocol that enables different wireless devices to communicate on a municipal, national, regional, and even global level. For example, 5G NR (new radio) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with requirements, especially in terms of latency and reliability; and massive machine type communications for a very large number of connected devices, and typically transmitting a relatively low volume of non-delay-sensitive information. However, as the demand for mobile broadband access continues to increase, there exists a need for further improvements in 5G communications technology and beyond. Preferably, these improvements should be applicable to other multi-access technologies and the telecommunication standards that employ these technologies.

In 5G communications, a base station (BS) or a user equipment (UE) may utilize directional beamforming technology during transmission. Beamforming technology may improve performance of millimeter wave (mmW or mmwave) systems. To maximize bandwidth and minimize data loss, BS and/or UE may use directional beams to establish links in steady-state/peak data rate transmissions. While sending data using the available antenna arrays may increase transmission gain, further improvements in the use of directional beams may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A method, apparatus, and computer-readable medium for antenna-array size adaptation at a BS include performing an initial beam refinement procedure using a plurality of antenna arrays with one or more devices, transmitting a notification indicating initiation of the enhanced beam training procedure, transmitting, subsequent to the initial beam refinement procedure, a plurality of beams using a plurality of antenna configurations to the one or more devices as part of an enhanced beam training procedure, wherein each antenna configuration includes a different subset of the plurality of antenna arrays used to transmit a different beam of the plurality of beams, receiving a plurality of feedback messages from the one or more devices associated with the plurality of beams transmitted using the plurality of antenna configurations, selecting an antenna configuration including a subset of the plurality of antenna arrays based on the plurality of feedback messages from the one or more devices, and communicating with the one or more devices using the selected subset of the plurality of antenna arrays.

A method, apparatus, and computer-readable medium for antenna-array size adaptation at a BS include transmitting, as part of an enhanced beam training procedure, an initial beam using an initial antenna configuration having a plurality of antenna arrays to a device, receiving an initial feedback message associated with the initial beam from the device, analyzing a reduced-power antenna configuration by: transmitting a reduction beam using a subset of the plurality of antenna arrays to the device, receiving a reduction feedback message from the device associated with the reduction beam, evaluating a difference in a quality of transmission between the initial beam and the reduction beam, iteratively analyzing the reduced-power antenna configuration until locating a selected antenna configuration in which the difference in the quality of transmission between the initial beam and the reduction beam improves beyond a predetermined threshold, and communicating with the device based on the selected antenna configuration.

A method, apparatus, and computer-readable medium for antenna-array size adaptation at a BS include performing an initial beam refinement procedure using a plurality of antenna arrays with a device, transmitting, subsequent to the initial beam refinement procedure, a plurality of beams using a plurality of antenna configurations to the device as part of an enhanced beam training procedure, wherein each antenna configuration includes a different subset of the plurality of antenna arrays used to transmit a different beam of the plurality of beams, receiving a plurality of feedback messages from the device associated with the plurality of beams transmitted using the plurality of antenna configurations, transmitting a first number corresponding to a total number of antenna arrays to the device, receiving a second number smaller than the first number indicating a recommended number of antenna arrays from the device, selecting an antenna configuration based on the second number and the plurality of feedback messages sent from the device, and communicating with the device using the selected antenna configuration.

A method, apparatus, and computer-readable medium for selecting an antenna configuration at a UE include participating in an initial beam refinement procedure with a base station (BS), receiving, via the transceiver and subsequent to the initial beam refinement procedure, a plurality of beams using a plurality of antenna configurations from the BS as part of an enhanced beam training procedure, wherein each antenna configuration includes a different subset of the plurality of antenna arrays used to transmit a different beam of the plurality of beams, transmitting, via the transceiver, a plurality of feedback messages associated with the plurality of beams transmitted using the plurality of antenna configurations, receiving, via the transceiver, a first number corresponding to a total number of antenna arrays at the BS, selecting a second number smaller than the first number indicating a recommended number of antenna arrays based on the first number and the plurality of beams, transmitting the second number to the BS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
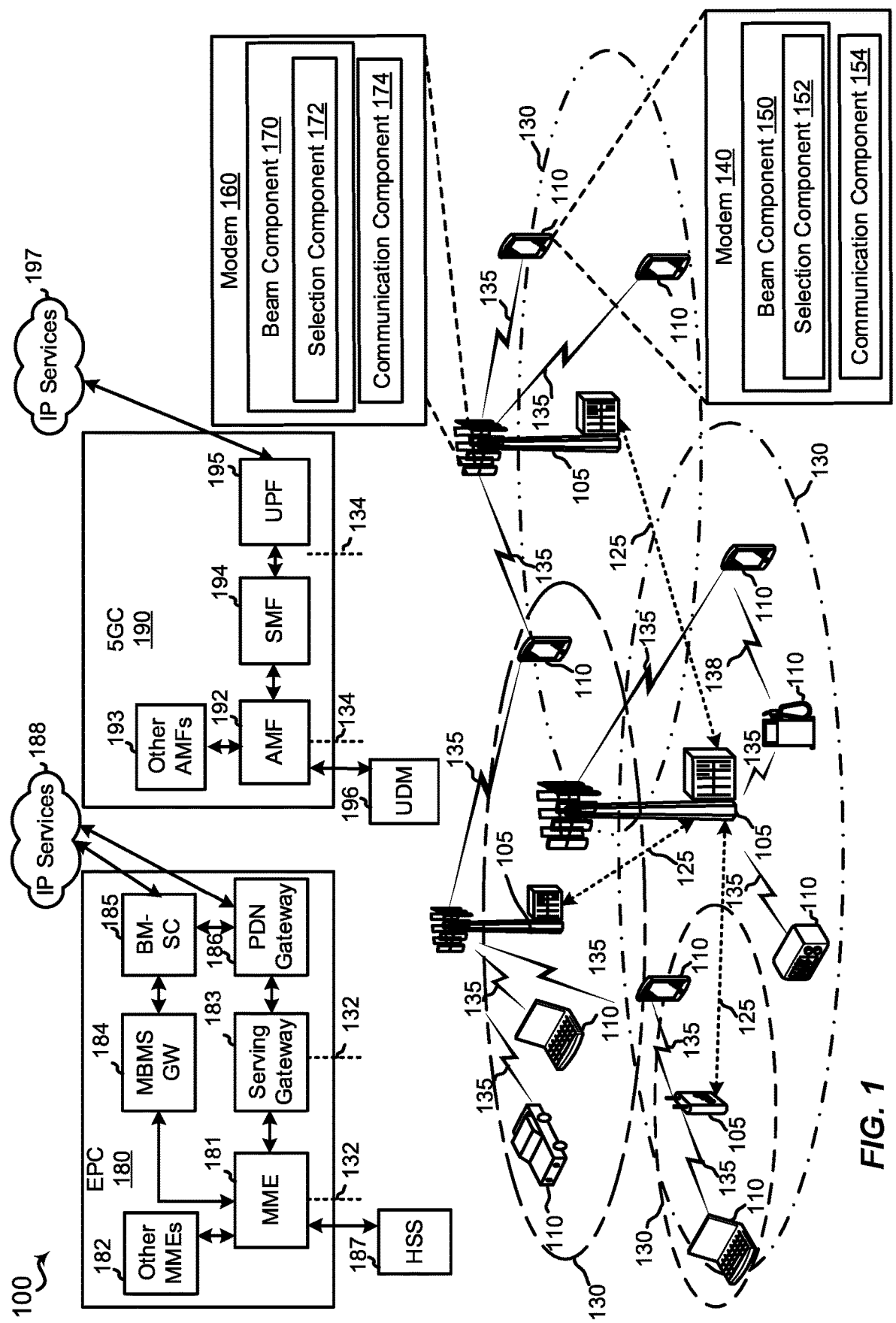
FIG. 1 is a schematic diagram of an example of a wireless communication network including at least one user equipment.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatuses and methods. These apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium, such as a computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA.

A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

During operation within a mobile network, a base station (BS) may utilize n available antennas, where n is a positive number, to transmit data using beamforming at an optimum data rate to a receiving user equipment (UE). However, in some circumstances, the BS may attempt to transmit data using less than the n available antennas in order to conserve power without excessively degrading the data rate. For example, the receiving UE may be physically close to the base station and may be able to receive the transmitted data at the desired data rate for the application at hand without the BS utilizing the n available antennas. In other implementations, the optimum data rate between the BS and the UE may be the highest sustainable data rate given the physical circumstances (distance between the BS and the UE, obstructions between the BS and the UE, etc.), a data rate determined by the network or the BS, a data rate necessary to support the applications used by the UE, a minimum data rate guaranteed by the network operator to the UE per contract over a certain fraction of the time, a data rate used by other UEs in the network, a highest data rate supported by the UE, a highest data rate the BS is able to provide given the network conditions, or data rates satisfying other conditions.

According to the present disclosure, the BS may perform an enhanced beam training procedure based on feedback from one or more UEs being served by the BS to identify a beam having a specific antenna configuration that may transmit the data near the optimum data rate or at an acceptable data rate (i.e., lower than the optimum rate). The identified beam may utilize less than the n available antennas for transmission. The number of antennas used in the identified beam may depend on, but is not limited to, the channel structure, angular spread, fading statistics, and pre-beamforming signal-to-noise ratio (or link budget). Using the enhanced beam training procedure, the BS may send data at reduced power (i.e., power consumed by the antenna array when less than n available antennas are being used) while still maintaining an optimum and/or acceptable quality of transmission.

Referring to FIG. 1, in accordance with various aspects of the present disclosure, the wireless communication network 100 may include one or more BSs 105, one or more UEs 110, and a core network such as an Evolved Packet Core (EPC) 180 or a Fifth Generation Core (5GC) 190. The base station 105 may perform an enhanced beam training procedure with a plurality of UEs 110, or with a single UE 110, including receiving feedback from the plurality or the single UE 110 and adjusting a configuration of an antenna array of the base station 105 based on the feedback.

For example, the BS 105 may utilize a beam component 170 of a modem 160 to send a number of beams with different antenna configurations to the UE 110. In response, the BS 105 may use a communication component 174 to receive feedback messages, indicating the qualities of transmission of the beams, from one or more UEs 110. Based on the content of the feedback messages, the BS 105 may use the selection component 172 to select an antenna configuration for future transmission. The selected antenna configuration may enable the BS 105 to send data using power less than, for example, the full transceiver power, to send information at an acceptable transmission quality. In a non-limiting example, the enhanced beam training procedure may enable the BS 105 to transmit data using beamforming with 50% of the available antennas while experiencing a 3% or less increase in data loss.

Correspondingly, the UE 110 may also utilize a beam component 150 of a modem 140 to receive the number of beams with different antenna configurations sent by the BS 105. The UE 110 may also use the beam component 150 to determine the qualities of transmission associated with the number of beams. Next, the UE 110 may send the feedback messages, indicating the qualities of transmission of the beams, to the BS 105 using a communication component 154 of the modem 140. The UE 110 may also use the communication component 154 to receive the number of available antennas used by the BS 105 for transmission. After receiving the number of available antennas, the UE 110 may use a selection component 152 to select a preferred number of antennas for the BS 105 to use when communicating with the UE 110.

The modem 160 of base station 105 may be configured to communicate with other base stations 105 and UEs 110 via a cellular network or other wireless and wired networks. The modem 140 of UE 110 may be configured to communicate via a cellular network, a Wi-Fi network, or other wireless and wired networks. The modems 140, 160 may receive and transmit data packets, via transceivers.

The EPC 180 or the 5GC 190 may provide user authentication, access authorization, tracking, internet protocol (IP) connectivity, and other access, routing, or mobility functions. The base stations 105 configured for 4G LTE (collectively referred to as Evolved Universal Mobile Telecommunications System (UMTS) Terrestrial Radio Access Network (E-UTRAN)) may interface with the EPC 180 through backhaul links 132 (e.g., S1, etc.). The base stations 105 configured for 5G NR (collectively referred to as Next Generation RAN (NG-RAN)) may interface with the 5GC 190 through backhaul links 134 (e.g., X1, X2, etc.). In addition to other functions, the base stations 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 105 may communicate with each other directly or indirectly (e.g., through the EPC 180 or the 5GC 190) over backhaul links 125 (e.g., X1). The backhaul links 125, 132, and/or 134 may be wired or wireless communication links.

The base stations 105 may wirelessly communicate with the UEs 110 via one or more base station antennas. Each of the BS 105 may provide communication coverage for a respective geographic coverage area 130. In some examples, the base stations 105 may be referred to as a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that may be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for EPC 180 or the 5GC 190 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Some non-limiting examples of UEs 110 may include a session initiation protocol (SIP) phone, a satellite radio, a global positioning system, a multimedia device, a video device, a digital audio player (e.g., MP3 player), a camera, a game console, a smart device, a wearable device, a vehicle, an electric meter, a gas pump, a large or small kitchen appliance, a healthcare device, an implant, a sensor/actuator, a display, or any other similar functioning device. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. Some examples of IoT devices may include parking meter, gas pump, toaster, vehicles, and heart monitor. A UE 110 may be able to communicate with various types of base stations 105 and network equipment including macro eNBs, small cell eNBs, macro gNBs, small cell gNBs, relay base stations, and/or other network equipment.

A UE 110 may be configured to establish one or more wireless communication links 135 with one or more BS 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The communication links 135 may use multiple-input and multiple-output (MIMO) antenna technology, including spatial multiplexing, beamforming, and/or transmit diversity. The base stations 105 and/or UEs 110 may use spectrum up to Y MHz (e.g., 5, 10, 15, 20, 30, 50, 100, 200, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 138. The D2D communication link 138 may use the DL/UL WWAN spectrum. The D2D communication link 138 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

The small cell may operate in a licensed and/or an unlicensed frequency spectrum. When operating in an unlicensed frequency spectrum, the small cell may employ NR and use the same 5 GHz unlicensed frequency spectrum as used by the Wi-Fi AP. The small cell, employing NR in an unlicensed frequency spectrum, may boost coverage to and/or increase capacity of the access network.

A base station 105, whether a small cell or a large cell (e.g., macro base station), may include an eNB, gNodeB (gNB), or other type of base station. Some base stations 105 may operate in a traditional sub 6 GHz spectrum, in millimeter wave (mmW) frequencies and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, and may also be referred to as centimeter wave. Communications using the mmW and/or near mmW radio frequency band has extremely high path loss and a short range. The mmW base station 105 may utilize beamforming with the UEs 110 to compensate for the extremely high path loss and short range.

In a non-limiting example, the EPC 180 may include a Mobility Management Entity (MME) 181, other MMEs 182, a Serving Gateway 183, a Multimedia Broadcast Multicast Service (MBMS) Gateway 184, a Broadcast Multicast Service Center (BM-SC) 185, and a Packet Data Network (PDN) Gateway 186. The MME 181 may be in communication with a Home Subscriber Server (HSS) 187. The MME 181 is the control node that processes the signaling between the UEs 110 and the EPC 180. Generally, the MME 181 provides bearer and connection management. All user Internet protocol (IP) packets are transferred through the Serving Gateway 183, which itself is connected to the PDN Gateway 186. The PDN Gateway 186 provides UE IP address allocation as well as other functions. The PDN Gateway 186 and the BM-SC 185 are connected to the IP Services 188. The IP Services 188 may include the Internet, an intranet, an IP Multimedia Subsystem (IMS), a PS Streaming Service, and/or other IP services. The BM-SC 185 may provide functions for MBMS user service provisioning and delivery. The BM-SC 185 may serve as an entry point for content provider MBMS transmission, may be used to authorize and initiate MBMS Bearer Services within a public land mobile network (PLMN), and may be used to schedule MBMS transmissions. The MBMS Gateway 184 may be used to distribute MBMS traffic to the base stations 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Figure 2:
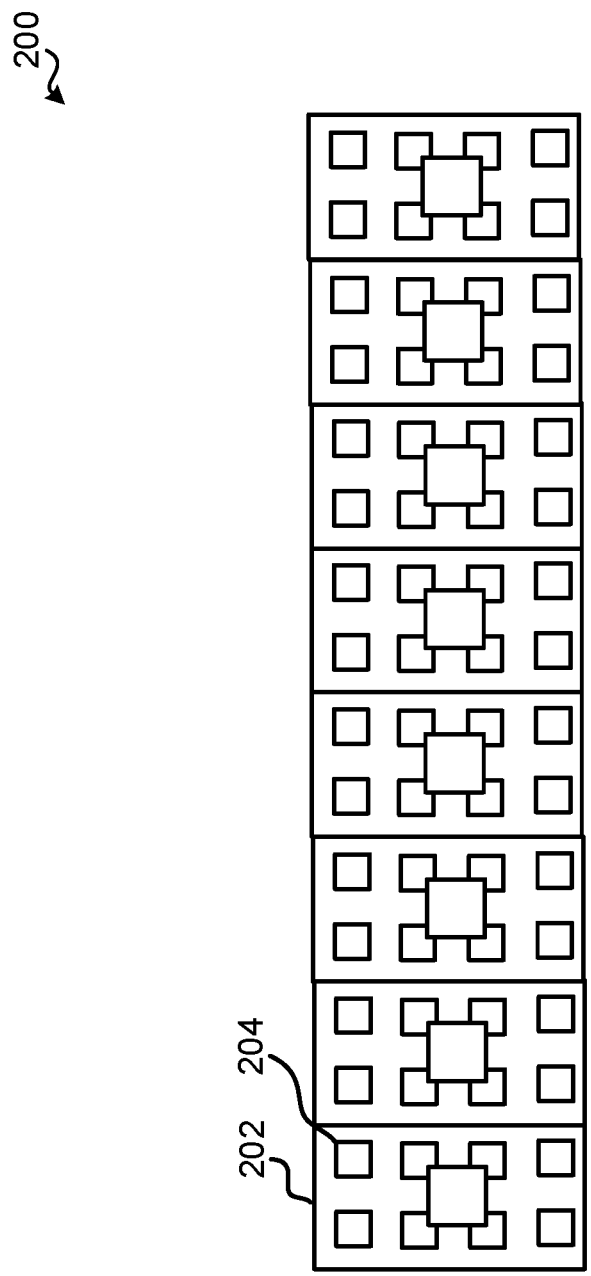
FIG. 2 is an example configuration of an antenna array configuration that may be used to transmit signals using beamforming, the configuration of which may be adjusted by the enhanced beam training techniques of the present disclosure.

Referring to FIG. 2, base station 105 may use a configurable antenna array, such as example antenna array 200, for transmitting signals using beamforming. Further, base station 105 may adjust the configuration of antenna array 200 using the feedback-based enhanced beam training techniques in accordance with aspects described herein. For example, base station 105 may utilize the antenna array 200 for communicating with one or more devices, such as the UEs 110. In an example, antenna 665 in FIG. 6 may be part of or may otherwise include antenna array 200. As shown, the antenna array 200 may include multiple modules (which may include RF integrated circuit (RFIC) modules, also referred to herein as RF components), such as a module 202, each having a number of antennas, such as an antenna 204. In the depicted example, the antenna array 200 may be a 16×4 antenna array including 8 2×4 antenna RFIC modules (e.g., in a modular construction). In some examples, the base station 105 may be expected to use large antenna arrays (16×4, 32×4, 32×8, 64×4, 64×8, 128×16, etc.). The large arrays may be assembled using smaller antenna modules (4×4, 4×2, 2×2, etc.) as a modular construction may be easier and/or be more cost effective to implement than a non-modular construction for mmW. In an ideal scenario, e.g., where there are no concerns about power consumption, all antennas of the large array may or should be used. When all the antennas are used, the beamforming array gain/rate may grow with antenna dimensions. Due to the modular construction, however, using more antennas may consume more RF and modem (MDM) power as different RFICs get excited. Higher data rates may be available at the cost of more power in the antenna array 200, but more power may also lead to increase in operational expenses (OPEX) of the antenna array 200. In addition, given that synchronization signal (SS) blocks may be used for broadcast and/or common base station transmissions, there may be a desirable antenna size to use at base station 105 for energy efficiency in transmitting wireless communications, which base station 105 may determine using user feedback.

For example, in an implementation, base station 105 may determine an energy efficient antenna array configuration using the following equations. Base station 105 may determine the desired array size, $N_t^*$, defined as:

$$N_t^* = \arg\max_{N_t \in [1, N_t^{max}]} \text{Effective Rate}_i$$

where the base station 105 is equipped with up to $N_t^{max}$ antennas.

$N_t^*$ may be any choice from 1 to $N_t^{max}$ and the precise answer depends on channel structure (angular spread, fading statistics, etc.), pre-beamforming SNR, and a utility function, $U(\ )$ capturing the energy consumption in the antenna circuitry.

The effective rate at $UE_i$ in bits/sec/mW (=bits/mJ) may be defined as:

$$\text{Effective Rate}_i = \frac{\text{Rate}_i}{U(RF \text{ power})}$$

The term $\text{Rate}_i$ may be an achieved rate at a $UE_i$ with synchronization signal (SS) block transmissions of a certain gNB codebook and a user-specific codebook. The codebooks at both ends correspond to either uni-/multi-directional beams with energy spatially allocated in single/multiple directions. Further, assume a certain utility function to translate RF power consumed at the BS (e.g., gNB) side in relation with $\text{Rate}_i$. Also, assume RF power with an $N_t$ element antenna array is increasing with $N_t$. The term $U(RF$ power) may denote a utility function. In some aspects of the present disclosure, the proposed solution of reduction in antennas at gNB side may be different as setting some beam weights to zero in the previous codebook. In a particular example, the proposed solution is NOT a codebook adaptation and hence cannot be subsumed as a gNB implementation. Setting some beam weights to zero does not turn OFF associated parts of the RF circuitry that are power hungry (e.g., VCO, VGAs, etc.). So RF power consumption with a larger array codebook and some beam weights set to zero is NOT the same as and/or comparable with using any other codebook for the correct array size. The present disclosure may focus on the latter approach and completely turn off certain parts of the RF circuitry and hence, improve power savings.

In a first scenario, an aspect of the enhanced beam training procedure described herein may be implemented in a broadcast manner, e.g., by base station 105 communicating with and obtaining feedback from a plurality of UEs 110.

For example, a first implementation of the first scenario includes P-1, P-2, and P-3 stages of a beam refinement procedure for initial link establishment and beam refinement that is first performed by the BS 105 with the UEs 110 according to the 5G-NR standard specifications. The P-1, P-2, and/or P-3 stages of the beam refinement procedure may be pre-programmed into the BS 105. The P-1, P-2, and/or P-3 stages may be the procedures used among the BS 105 and the UEs 110 (based on a previously agreed-upon standard such as 5G-NR) for beam refinement. The UEs 110 may report to the BS 105 the best BS-side beam indices and associated RSRP of the best-M beams. Next, a subsequent enhanced beam training procedure (potentially targeting multiple UEs) may be envisioned for energy efficiency considerations. In contrast to the initial SS block transmissions with a baseline antenna configuration, the BS 105 indicates to the UEs 110 of a dedicated broadcast training session/period for array size estimation. Initiation of this session may be indicated to the UEs 110. The initial beam refinement procedures (i.e., including the P-1, P-2, and/or P-3 stages) may be performed before and/or with other beam refinement procedures described below.

For example, the BS 105 may transmit a number of training signals (e.g., synchronization signals or reference signals) using different antenna configurations to the UEs 110. The UEs 110, upon receiving the training signals, may report to the BS 105 indicating the qualities (e.g., a reference signal received power (RSRP), a received signal strength indicator (RSSI), a signal-to-noise ratio (SNR), or a signal-to-interference-noise ratio (SINR), etc.) of the number of training signals. Based on the feedback, the BS 105 may determine the best configuration(s), which may be different for different UEs 110.

In a non-limiting example, a second implementation includes a method of enhanced beam training where the BS 105 cycles through different antenna configurations and a corresponding beam codebook appropriate for these antenna configurations. In response, the UE 110 reports RSRP/RSSI/SNR/SINR or spectral efficiency for different beam/antenna configurations. The UE 110 may report the best beam/antenna combinations over the training period which is mapped back to a specific reverse link resource element. The BS 105 may incorporate that with RF power consumption data based on antenna configuration and makes a decision on $N_t^*$.

For example, a third implementation includes the BS 105 informing the UE 110 of $N_t^{max}$, and the UE 110 requests a specific antenna configuration to be used by the BS 105 based on use-case estimation/prediction, environment sensing (LOS/NLOS, blockage, etc.). The UE 110 may request the antenna configuration based on previous training data, one or more lookup tables provided by the BS 105, or other suitable methods. The BS 105 may use appropriate beam codebook for that configuration. In response, the UE 110 may report relevant information, such as RSRP, RSSI, SNR, SINR, and the BS 105 may make a decision on $N_t^*$ by comparing it with baseline antenna configuration.

For example, a fourth implementation includes the BS 105 informing the UE 110 of $N_t^{max}$ and certain baseline power consumption numbers, and the UE 110 may estimate $N_t^*$ and feed this information back to the BS 105. The UE 110 may rely on a predetermined equation, such as the equations above, to estimate the values of $N_t^*$.

In some cases, a fifth implementation may include leveraging minor variations that may exist across different RFICs/modules, in terms of elemental patterns/array gains, in order to provide an efficient antenna array configuration.

In certain examples, a sixth implementation includes training that is done one time and array sizes at the BS 105 are adapted based on certain UE 110 side feedback metrics (e.g., link margin, channel conditions, etc.) as channel evolves.

In another example, a seventh implementation includes using one or more of the above techniques that work with gNB-UE links as well as with gNB-gNB links in an integrated access and backhaul (IAB) setting. In the case of a backhaul setting, array size estimation may be done at both ends of the link. For example, a RX BS (BS 105) may report RSRP and/or the power consumption utility function including the subarray size used for the reported RSRP to the TX BS (a different BS 105). The TX BS, upon obtaining the information provided by the RX BS, may make a decision to maximize the effective rate $N_t^*$ while considering the power consumption.

In a second scenario, an aspect of the enhanced beam training procedure described herein may be implemented in a user-specific manner, e.g., by base station 105 communicating with and obtaining feedback from a single UE 110.

In a first implementation of the second scenario, different methods may be considered for the enhanced beam training that targets a specific user or UE 110. Based on the best beams learned over the SS blocks, the BS 105 and UE 110 may iteratively adjust their beams along Steps A-C (as below) until the BS 105 stops beam refinement according to a certain criteria or the UE 110 asks the BS 105 to stop beam refinement. In Step A, the BS 105 may compare the reported RSRP for the best beam of the UE 110 against different RSRP thresholds and select an array size reduction factor over the baseline array size (used in SS block transmission) for the UE 110. Next, in Step B, with the reduced array at the BS 105, the BS 105 may set up the UE 110 for a beam refinement/adjustment session. Next, in Step C, the UE 110 may learn the adjusted beam and report the RSRP of the adjusted beam. Step A may lead to power savings at the BS 105 side, as array size is decreased for the UE's specific use-case. Step B may further refine UE side beam in response to the first step. The Step C may help the BS 105 and the UE 110 refine this process iteratively as necessary. The Steps A-C refinement procedures may be performed once or more than once.

In an extension to the second scenario, utilizing the antenna array 200 with non-traditional configurations may provide additional advantages. For example, the above-described implementations may have assumed that the antenna array is made of a modular structure with antennas spaced $\lambda/2$ apart. For example, an antenna array selected for use by base station 105 may be a uniform rectangular/planar array with $\lambda/2$ spacing (e.g., 4×2 could be from Module 0, 4×4 could be from Modules 0 and 1, etc.).

In this extension, however, there is also value in choosing antenna arrays that are non-uniform or uniform with $>\lambda/2$ spacings. For instance, the following examples provide potential implementations of this extension, although this extension is not limited to these solutions: Example A: Select a 8×2 antenna array with antennas that are $\lambda$ apart; Example B: Select a 4×1 antenna array with antennas that are $2\lambda$ apart; and, Example C: Select a random subset of 4 antennas within Modules 0 and 1. The selections may involve more extensive training as the number of combinations exponentially increase with $N_t^{max}$.

Accordingly, based on the above-description related to the first and second scenarios, the aspects described herein may involve a plurality of different implementations and techniques.

For example, a first technique may include a method for a first device with a large antenna array to indicate to a second device whether an enhanced beam training procedure may be used. In this case, enhanced beam training may be a broadcast (i.e., one BS 105 and more than one UE 110) or dedicated user-specific (i.e., one BS 105/one UE 110 and one BS 105/one UE 110) training period after the initial link has been established with P-1/2/3 procedures. Alternatively, or in addition, in this case, enhanced beam training may use different antenna size configurations and codebooks at the first device. Alternatively, or in addition, in this case, the indication to initiate enhanced beam training may be a one bit field in radio resource control (RRC), downlink control information (DCI), media access control control element (MAC-CE), or any other beam management protocol fields. Alternatively, or in addition, in this case, different types of enhanced beam training procedures may be conveyed with larger indication sizes.

In another example, a second technique may include a method for the first device to use the enhanced beam training procedure to select a subset of antennas for Tx/Rx based on a combination of spectral/energy efficiency metrics. Alternatively, or in addition, in this case, spectral efficiency metric may be rate realized in beamforming. Alternatively, or in addition, in this case, energy efficiency metric may be a utility function capturing RF and/or MDM power consumption based on transmit/receive modes.

In certain examples, a third technique includes a method for array size selection based at least on feedback from the second device in response to the enhanced beam training procedure. Alternatively, or in addition, in this case, the second device may report a spectral efficiency metric for the best array/beam combinations. Alternatively, or in addition, in this case, metric to be reported could be one of RSRP, RSSI, SNR, or SINR. Alternatively, or in addition, in this case, metric reported from the second device combined with energy efficiency metric at the first device in making the selection. Alternatively, or in addition, in this case, antenna selection may account for asymmetries between elemental gain and/or array gain patterns.

In another example, a fourth technique may include a method for first device to convey at least one of maximal array size information or certain energy efficiency related information to second device followed by enhanced beam training and conveying of appropriate array size information back to first device by second device. Alternatively, or in addition, in this case, the selection of array size at second device may be based on information conveyed by first device and beam training information learned.

For example, a fifth technique may include a method for first device to adapt array size dynamically based on feedback of other information on changing channel conditions from second device.

In certain examples, a sixth technique may include a method for the first device to iteratively refine the beam(s) with the second device based on feedback from the second device in a user-specific training session. Alternatively, or in addition, in this case, feedback from second device may be in the form of RSRP, RSSI, SNR, or SINR of the best beam(s) in beam training. Alternatively, or in addition, in this case, first device may estimate an array size reduction factor based on comparison of fed back quantity with respect to certain appropriately designed thresholds. Alternatively, or in addition, in this case, with the reduced array, the first device may offer a user-specific beam refinement session to the second device.

For example, a seventh technique may include a method for the first device to select different choices of non-uniform arrays, uniform arrays with larger antenna spacings than λ/2, etc. in enhanced beam training. Alternatively, or in addition, in this case, antenna selection may account for asymmetries between elemental gain and/or array gain patterns For example, an eighth technique may include the above techniques and the first device could be a gNB and second device could be a user equipment or both devices could be gNBs.

Figure 3:
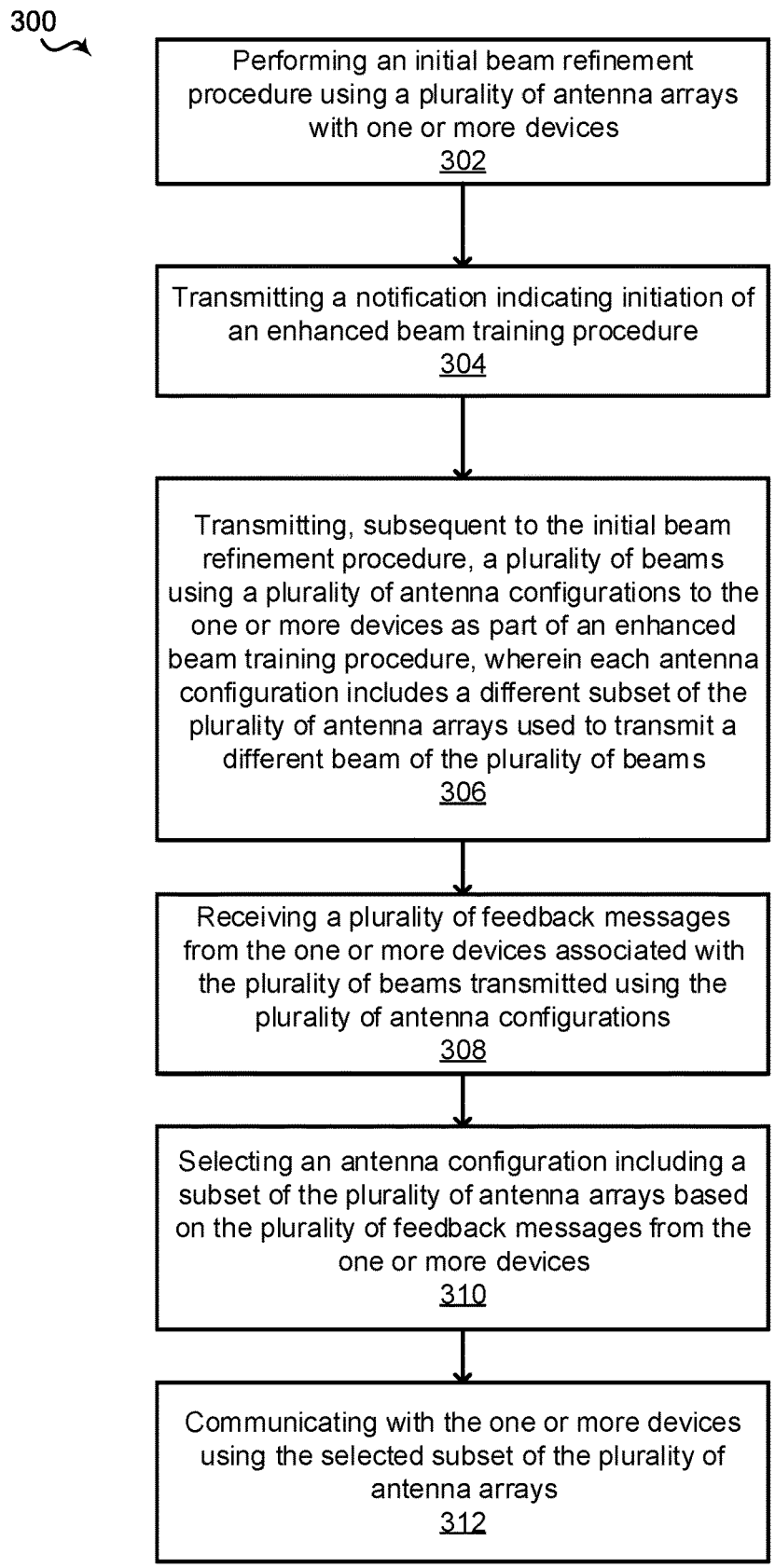
FIG. 3 is an example of a method of performing enhanced beam training at the BS.

Referring to FIG. 3, a method 300 illustrates an enhanced beam training for use by base station 105 in adjusting a configuration of an antenna array. The method 300 may be an example method illustrating scenario 1, the first and second implementations, described above. Specifically, the method 300 may perform the enhanced beam training in a broadcast manner, e.g. with one or more devices (i.e., one BS 105 and more than one UE 110).

At block 302, the method 300 may perform an initial beam refinement procedure using a plurality of antenna arrays with one or more devices. For example, the beam component 170 of the BS 105 may perform an initial beam refinement procedure using an antenna system 665 with the UE 110 (e.g., all available antennas in the antenna system 665). The antenna system 665 may include a 64×16 antenna array. In a non-limiting example, the BS 105 may perform the initial beam refinement procedure using all of the available antenna array (e.g., 64×16 antenna array). In other examples, the antenna system 665 may include a 16×4 array, a 32×4 array, a 32×8 array, a 64×4 array, a 64×8 array, or a 128×16 array. The initial beam refinement procedure may include three stages, e.g., P-1, P-2, and P-3 initial beam refinement procedures as identified in the 3GPP 5G NR standards. During the first stage, e.g., P-1, the BS 105 may send a number of beams to the beam component 150 of the UE 110. The beams may be sent with the same number of antenna arrays, such as the available antenna array (e.g., 64×16 array). The UE 110 may measure the data rate of the beams using the beam component 150 and send feedback information to the BS 105 using the communication component 154. During the second stage, e.g., P-2, the BS 105 may utilize the feedback information to select a beam for transmission. During the third stage, e.g., P-3, the UE 110 may use the transmission of the beams and the feedback information to determine, via the selection component 152, a beam configuration when sending information to the BS 105. In other non-limiting examples, the enhanced beam training may be performed with multiple UEs 110, another BS 105, multiple BSs 105, or any combination thereof.

At block 304, the method 300 may transmit a notification indicating initiation of an enhanced beam training procedure. For example, the communication component 174 of the BS 105 may transmit a notification indicating initiation of an enhanced beam training procedure to the communication component 154 of the UE 100 after the initial beam refinement procedure. The notification may be embedded in a RRC bit, a DCI bit, a MAC-CE bit, or a multi-bit field.

At block 306, the method 300 may transmit, subsequent to the initial beam refinement procedure, a plurality of beams using a plurality of antenna configurations to the one or more devices as part of the enhanced beam training procedure, wherein each antenna configuration includes a different subset of the plurality of antenna arrays used to transmit a different beam of the plurality of beams. For example, the beam component 170 of the BS 105 may transmit, to the beam component 150 of the UE 110, a first beam using a 4×16 antenna array, a second beam using an 8×16 antenna array, a third beam using a 12×16 array, and a fourth beam using a 16×16 array. The antenna configurations may include any different number of antennas, for example, less than the total number of antennas in the antenna system 665. The BS 105 may transmit the beams using less than the total number of antennas in the antenna system 665 in order to search for a beam configuration that may maintain an optimum or acceptable data rate/SNR with reduced power consumption due to the reductions of antennas.

At block 308, the method 300 may receive a plurality of feedback messages from the one or more devices associated with the plurality of beams transmitted using the plurality of antenna configurations. For example, the communication component 174 may receive feedback messages associated with the first, second, third, and fourth beams from the communication component 154 of the UE 110. The feedback messages may indicate the quality of transmission of the beams using different antenna configurations, such as the 4×16 array, the 8×16 array, the 12×16 array, and the 16×16 array. The quality of transmission may be measured using one or more of data rates, data losses, performance gains, or other suitable parameters. In some implementations, the feedback messages may each include one or more of a spectral efficiency metric, a reference signal received power, a received signal strength indicator, a signal-to-noise ratio, or a signal-to-interference-noise ratio. In certain non-limiting examples, the feedback messages may indicate that the data rates associated with the first, second, third, and fourth beams are 5 Gigabits per second (Gbps), 9.7 Gbps, 9.9 Gbps, and 10 Gbps, respectively.

At block 310, the method 300 may select an antenna configuration including a subset of the plurality of antenna arrays based on the plurality of feedback messages from the one or more devices. For example, the selection component 172 of the BS 105 may select an antenna configuration having less than 64×16 antennas, such as 8×16 antennas. In some implementations, the selection component 172 may select the 8×16 antenna array based on one or more of the spectral efficiency metric, the energy efficiency (e.g., electrical power consumed during the transmission) associated with transmitting the beam, the received performance gains, the reference signal received power, the received signal strength indicators, the signal-to-noise ratios, or the signal-to-interference-noise ratios for each transmitted beam. In a non-limiting example, the selection component 172 may select the 8×16 antenna array configuration because the relatively high data rate of 9.7 Gbps and low power consumption. The BS 105 may select the antenna configuration to achieve an optimum and/or acceptable data rate such as the highest sustainable data rate given the physical circumstances (distance between the BS 105 and the UE 110, obstructions between the BS 105 and the UE 110, etc.), a data rate determined by the network or the BS 105, a data rate necessary to support the applications used by the UE 110, a data rate guaranteed by the network operator to the UE 110 per contract, a data rate used by other UEs 110 in the network, a highest data rate supported by the UE 110, a highest data rate the BS 105 is able to provide given the network conditions, or other data rates.

At block 312, the method 300 may communicate with the one or more devices using the selected subset of the plurality of antenna arrays. For example, the communication component 174 of the BS 105 may communicate with the communication component 154 of the UE 110 using the selected 8×16 antenna array. In some implementations, the BS 105 may communicate with other UEs 110 and BSs 105 using the selected 8×16 antenna array.

In certain examples, the BS 105 may perform the enhanced beam training when detecting any changes in the channel condition (e.g. degradation of signals in the uplink control channel or the downlink data channel), the data requirement of the UE 110 (e.g., the UE 110 may run applications that need a higher or lower data rate), the data requirement of the network 100 (e.g., the BS 105 is required to provide more or less data to the UEs 110 in the network), and/or other changes.

Figure 4:
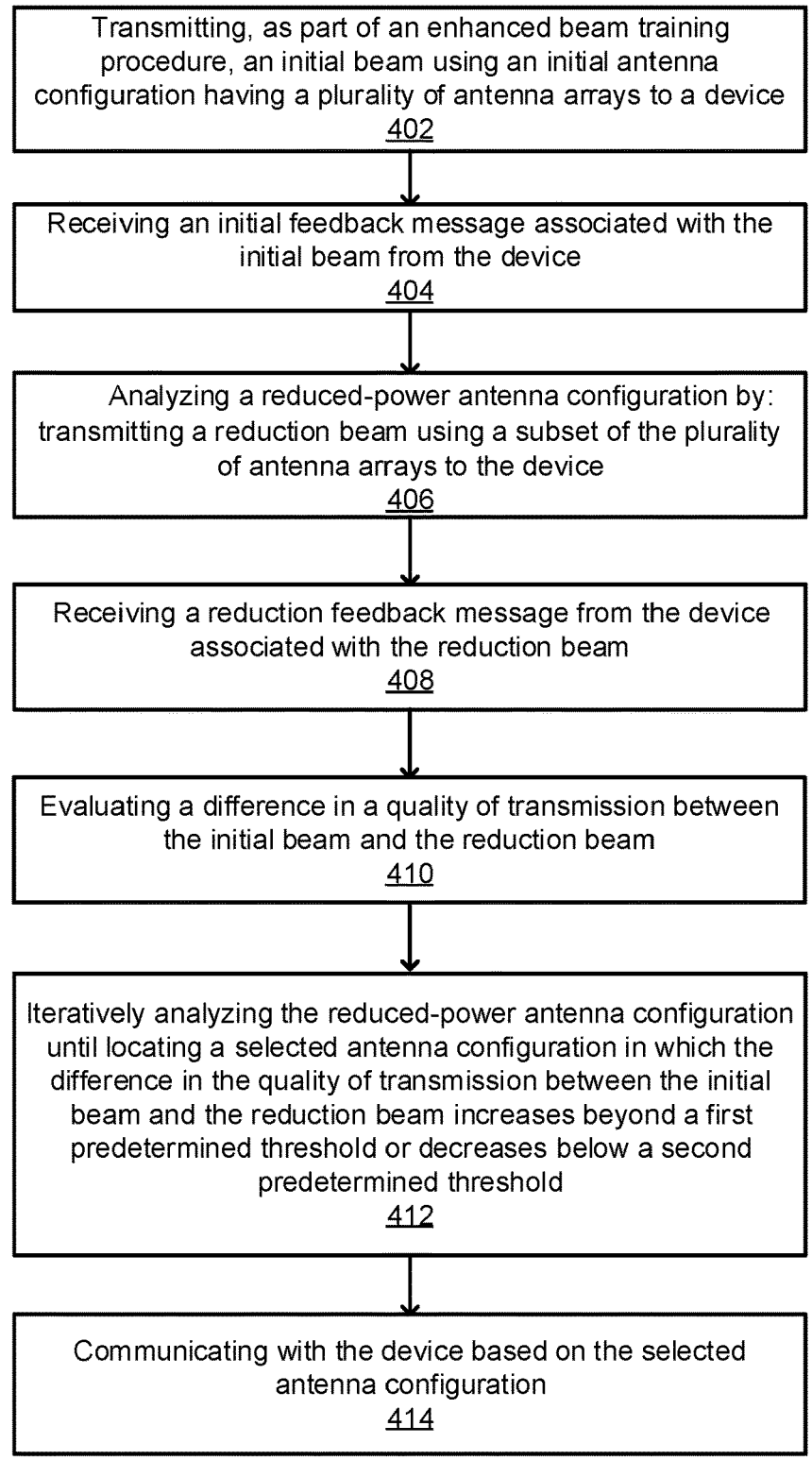
FIG. 4 is another example of a method of performing enhanced beam training at the BS.

Turning now to FIG. 4, a method 400 may perform another enhanced beam training procedure with a UE 110. The method 400 may be an example method illustrating the sixth implementation described above. Specifically, the method 400 may perform the enhanced beam training iteratively with a device to locate an antenna configuration having a quality of transmission equal to or better than a predetermined threshold.

At block 402, the method 400 may transmit, as part of an enhanced beam training procedure, an initial beam using an initial antenna configuration having a plurality of antenna arrays to a device. For example, the beam component 170 of the BS 105 may transmit an initial beam using the antenna system 665 having an antenna array (e.g., 64×16 antenna array) to the beam component 150 of the UE 110. In a non-limiting example, the BS 105 may transmit the initial beam using all of the available antenna array (e.g., 64×16 array). In other examples, the antenna system 665 may be a 16×4 array, a 32×4 array, a 32×8 array, a 64×4 array, a 64×8 array, or a 128×16 array. The initial beam may include synchronization signals (SS), reference signals, or other signals. The BS 105 may transmit the beams using less than the total number of antennas in the antenna system 665 in order to search for a beam configuration that may maintain an optimum or acceptable data rate/SNR with reduced power consumption due to the reductions of antennas.

At block 404, the method 400 may receive an initial feedback message associated with the initial beam from the device. For example, the communication component 174 may receive an initial feedback message from the communication component 154 of the UE 110 indicating the quality of transmission of the initial beam using the 64×16 antenna array of the antenna system 665. The UE 110 may utilize its beam component 150 to assess the quality of transmission. The quality of transmission may be measured using one or more of data rates, data losses, performance gains, or other suitable parameters. In some implementations, the initial feedback message may include one or more of a spectral efficiency metric, a reference signal received power, a received signal strength indicator, a signal-to-noise ratio, or a signal-to-interference-noise ratio. In certain non-limiting examples, the initial feedback message may indicate that the data rate associated with the initial beam is 10 Gbps.

At block 406, the method 400 may analyze a reduced-power antenna configuration by transmitting a reduction beam (e.g., less antenna array than all of the available antenna array) using a subset of the plurality of antenna arrays to the device. For example, the beam component 170 may analyze a reduced-power antenna configuration by transmitting a reduction beam using less than all of the available antenna array (e.g., a 4×16 antenna array) to the beam component 150 of the UE 110.

At block 408, the method 400 may continue analyzing the reduced-power antenna configuration by receiving a reduction feedback message from the device associated with the reduction beam. For example, the communication component 174 may receive a reduction feedback message associated with the reduction beam (sent using the 4×16 antenna array) from the communication component 154 of the UE 110. The reduction feedback message may include one or more of a spectral efficiency metric, a reference signal received power, a received signal strength indicator, a signal-to-noise ratio, or a signal-to-interference-noise ratio. The content of the feedback message may indicate the quality of transmission of the reduction beam. In some implementations, the reduction feedback message may indicate the data rate of the reduction beam (sent using the 4×16 antenna array) to be 3.4 Gbps.

At block 410, the method 400 may continue analyzing the reduced-power antenna configuration by evaluating a difference in a quality of transmission between the initial beam and the reduction beam. For example, the selection component 172 may evaluate a difference in the data rates of the initial beam (e.g., 10 Gbps) and the reduction beam (e.g., 3.4 Gbps).

Next, at block 412, the method 400 may iteratively analyze the reduced-power antenna configuration until locating a selected antenna configuration in which the difference in the quality of transmission between the initial beam and the reduction beam increases beyond a first predetermined threshold or decreases below a second predetermined threshold. For example, the modem 160 may iteratively analyze the reduced-power antenna configuration until locating a selected antenna configuration in which the difference in the quality of transmission between the initial beam and the reduction beam improves beyond a predetermined threshold. In a non-limiting example, the beam component 170 of the modem 160 may transmit a first reduction beam using an 16×16 antenna array and receive another reduction feedback message indicating a data rate of 9.8 Gbps. The difference in the data rates of the initial beam (e.g., 10 Gbps) and the reduction beam (e.g., 9.8 Gbps) is 0.2 Gbps, or 2% of the initial beam's data rate. Next, the beam component 170 of the modem 160 may transmit a second reduction beam using a 12×16 antenna array and receive another reduction feedback message indicating a data rate of 8.7 Gbps. The difference in the data rates is 1.3 Gbps, or 13% of the initial beam's data rate. Next, the beam component 170 of the modem 160 may transmit a third reduction beam using an 8×16 antenna array and receive another reduction feedback message indicating a data rate of 7.9 Gbps. The difference in the data rates is 2.1 Gbps, or 21% of the initial beam's data rate. Next, the beam component 170 of the modem 160 may transmit a reduction beam using a 4×16 antenna array and receive a reduction feedback message indicating a data rate of 3.4 Gbps. The difference in the data rates of the initial beam (e.g., 10 Gbps) and the reduction beam (e.g., 3.4 Gbps) is 6.6 Gbps, or 66% of the initial beam's data rate. The difference of 66% may be exceed a first predetermined threshold of 50%, and the 4×16 antenna array may be the selected antenna configuration.

In another non-limiting example, the beam component 170 of the modem 160 may transmit a first reduction beam using a 4×16 antenna array and receive a reduction feedback message indicating a data rate of 3.4 Gbps. The difference in the data rates of the initial beam (e.g., 10 Gbps) and the reduction beam (e.g., 3.4 Gbps) is 6.6 Gbps, or 66% of the initial beam's data rate. Next, the beam component 170 of the modem 160 may transmit a second reduction beam using an 8×16 antenna array and receive another reduction feedback message indicating a data rate of 7.9 Gbps. The difference in the data rates is 2.1 Gbps, or 21% of the initial beam's data rate. Next, the beam component 170 of the modem 160 may transmit a third reduction beam using a 12×16 antenna array and receive another reduction feedback message indicating a data rate of 8.7 Gbps. The difference in the data rates is 1.3 Gbps, or 13% of the initial beam's data rate. Next, beam component 170 of the the modem 160 may transmit a fourth reduction beam using an 16×16 antenna array and receive another reduction feedback message indicating a data rate of 9.8 Gbps. The difference in the data rates is 0.2 Gbps, or 2% of the initial beam's data rate. The difference of 2% may be below a second predetermined threshold of 5%, and the 16×16 antenna array may be the selected antenna configuration.

In certain implementations, other criteria may also be used in determining the beam configuration. For example, The BS 105 may select the antenna configuration to achieve an optimum and/or acceptable data rate such as the highest sustainable data rate given the physical circumstances (distance between the BS 105 and the UE 110, obstructions between the BS 105 and the UE 110, etc.), a data rate determined by the network or the BS 105, a data rate necessary to support the applications used by the UE 110, a data rate guaranteed by the network operator to the UE 110 per contract, a data rate used by other UEs 110 in the network, a highest data rate supported by the UE 110, a highest data rate the BS 105 is able to provide given the network conditions, or other data rates. In some implementations, the selected antenna configuration may include non-uniform antenna arrays, such as antenna arrays with spacing greater than one half of a minimum feature size. The BS 105 may transmit the beams using less than the total number of antennas in the antenna system 665 in order to search for a beam configuration that may maintain an optimum or acceptable data rate/SNR with reduced power consumption due to the reductions of antennas.

At block 414, the method 400 may communicate with the device based on the selected antenna configuration. For example, the communication component 174 may communicate with the communication component 154 of the UE 110 using the selected 16×16 antenna array. In some implementations, the communication component 174 may instruct the UE 110 to perform the enhanced beam training procedure.

Figure 5:
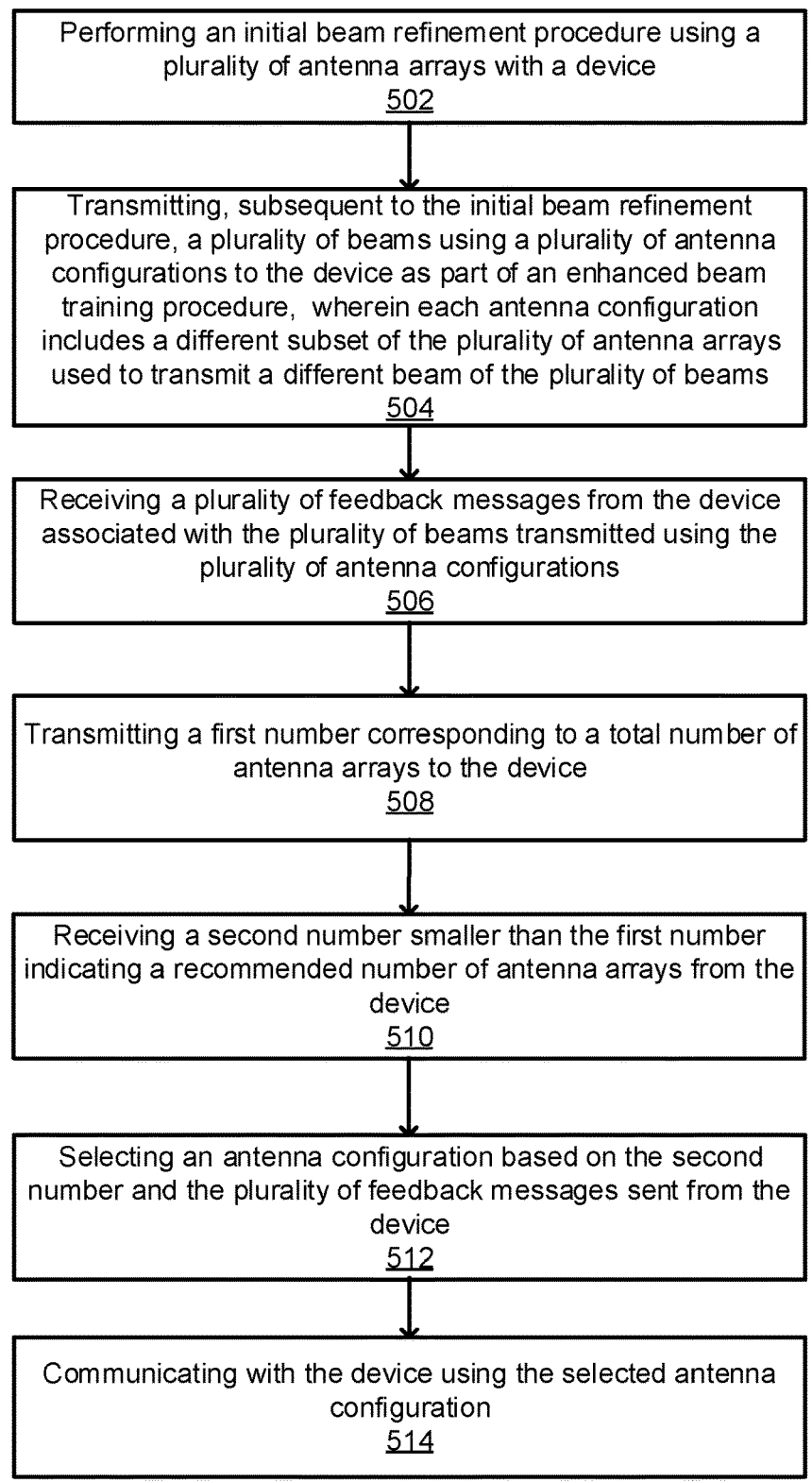
FIG. 5 is yet another example of a method of performing enhanced beam training at the BS.

Referring to FIG. 5, a method 500 illustrates another enhanced beam training procedure. The method 500 may be an example method illustrating the fourth implementation of scenario 1 and/or the fourth technique. Specifically, the method 500 may perform the enhanced beam training iteratively with a device by sending a number of available antennas to the device, and receiving a recommended number of antenna used for communication.

At block 502, the method 500 may perform an initial beam refinement procedure using a plurality of antenna arrays with a device. For example, the beam component 170 of the BS 105 may perform an initial beam refinement procedure using an antenna system 665 with the UE 110 (e.g., all available antennas in the antenna system 665). The antenna system 665 may include a 64×16 antenna array. In a non-limiting example, the BS 105 may perform the initial beam refinement procedure using all of the available antenna array (e.g., 64×16 antenna array). In other examples, the antenna system 665 may include a 16×4 array, a 32×4 array, a 32×8 array, a 64×4 array, a 64×8 array, or a 128×16 array. The initial beam refinement procedure may include three stages, e.g., P-1, P-2, and P-3 initial beam refinement procedures as identified in the 3GPP 5G NR standards. During the first stage, the BS 105 may send a number of beams to the beam component 150 of the UE 110. The beams may be sent with the same number of antenna arrays, such as the 64×16 array. The UE 110 may measure the data rate of the beams using the beam component 150 and send feedback information to the BS 105 using the communication component 154. During the second stage, the BS 105 may utilize the feedback information to select a beam for transmission. During the third stage, the UE 110 may use the transmission of the beams and the feedback information to determine, via the selection component 152, a beam configuration when sending information to the BS 105. In other non-limiting examples, the enhanced beam training may be performed with multiple UEs 110, another BS 105, multiple BSs 105, or any combination thereof.

At block 504, the method 500 may transmit, subsequent to the initial beam refinement procedure, a plurality of beams using a plurality of antenna configurations to the device as part of an enhanced beam training procedure, wherein each antenna configuration includes a different subset of the plurality of antenna arrays used to transmit a different beam of the plurality of beams. For example, the beam component 170 of the BS 105 may transmit, to the beam component 150 of the UE 110, a first beam using a 4×16 antenna array, a second beam using an 8×16 antenna array, a third beam using a 12×16 array, and a fourth beam using a 16×16 array. The antenna configurations may include any different number of antennas, for example, less than the total number of antennas in the antenna system 665. In some implementations, the BS 105 may first send a notification to the UE 110 indicating the beginning of the enhanced beam training procedure. The notification may be embedded in a RRC bit, a DCI bit, a MAC-CE bit, or a multi-bit field. The BS 105 may transmit the beams using less than the total number of antennas in the antenna system 665 in order to search for a beam configuration that may maintain an optimum or acceptable data rate/SNR with reduced power consumption due to the reductions of antennas.

At block 506, the method 500 may receive a plurality of feedback messages from the device associated with the plurality of beams transmitted using the plurality of antenna configurations. For example, the communication component 174 may receive corresponding feedback messages associated with the first, second, third, and fourth beams from the communication component 154 of the UE 110. The feedback messages may indicate the quality of transmission of the beams using different antenna configurations, such as the 4×16 array, the 8×16 array, the 12×16 array, and the 16×16 array. The quality of transmission may be measured using data rates, data losses, performance gains, or other suitable parameters. In some implementations, the feedback messages may each include a spectral efficiency metric, a reference signal received power, a received signal strength indicator, a signal-to-noise ratio, or a signal-to-interference-noise ratio. In certain non-limiting examples, the feedback messages may indicate that the data rates associated with the first, second, third, and fourth beams are 5 Gigabits per second (Gbps), 9.7 Gbps, 9.9 Gbps, and 10 Gbps, respectively.

At block 508, the method 500 may transmit a first number corresponding to a total number of antenna arrays to the device. For example, the communication component 174 may transmit 64×16, or the number 1024 to the communication component 154 of the UE 110 indicating the number of antennas in the antenna system 665.

At block 510, the method 500 may receive a second number smaller than the first number indicating a recommended number of antenna arrays from the device. For example, the communication component 174 may receive the number 128, or 8×16 from the communication component 154 of the UE 110. Alternatively, the communication component 174 may receive other numbers indicating a preferred antenna configuration by the UE 110. The UE 110 may utilize the selection component 152 to determine the number of antennas of the preferred antenna configuration. The UE 110 may select the number of antennas based on previous training data, the plurality of beams received (by the beam component 150) based on the plurality of antenna configurations, the quality of transmission (e.g., data rates, data losses, performance gains, a spectral efficiency metric, a reference signal received power, a received signal strength indicator, a signal-to-noise ratio, or a signal-to-interference-noise ratio), an internal look-up table, the data requirement of the UE 110, or other criteria.

At block 512, the method 500 may select an antenna configuration based on the second number and the plurality of feedback messages from the device. For example, the selection component 172 of the BS 105 may select an antenna configuration having less than 64×16 antennas, such as 8×16 antennas, based on the number 128. In some examples, the selection component 172 of the BS 105 may select an antenna configuration having the second number of antennas. In some implementations, the selection component 172 may also select the 8×16 antenna array based on one or more of the spectral efficiency metric, the energy efficiency (e.g., electrical power consumed during the transmission) associated with transmitting the beam, the received performance gains, the reference signal received power, the received signal strength indicators, the signal-to-noise ratios, or the signal-to-interference-noise ratios for each transmitted beam. In a non-limiting example, the selection component 172 may select the 8×16 antenna array configuration because its relatively high data rate of 9.7 Gbps and low power consumption.

At block 514, the method 500 may communicate with the device using the selected antenna configuration. For example, the communication component 174 of the BS 105 may communicate with the communication component 154 of the UE 110 using the selected 8×16 antenna array. In some implementations, the BS 105 may communicate with other UEs 110 and BSs 105 using the selected 8×16 antenna array.

Figure 6:
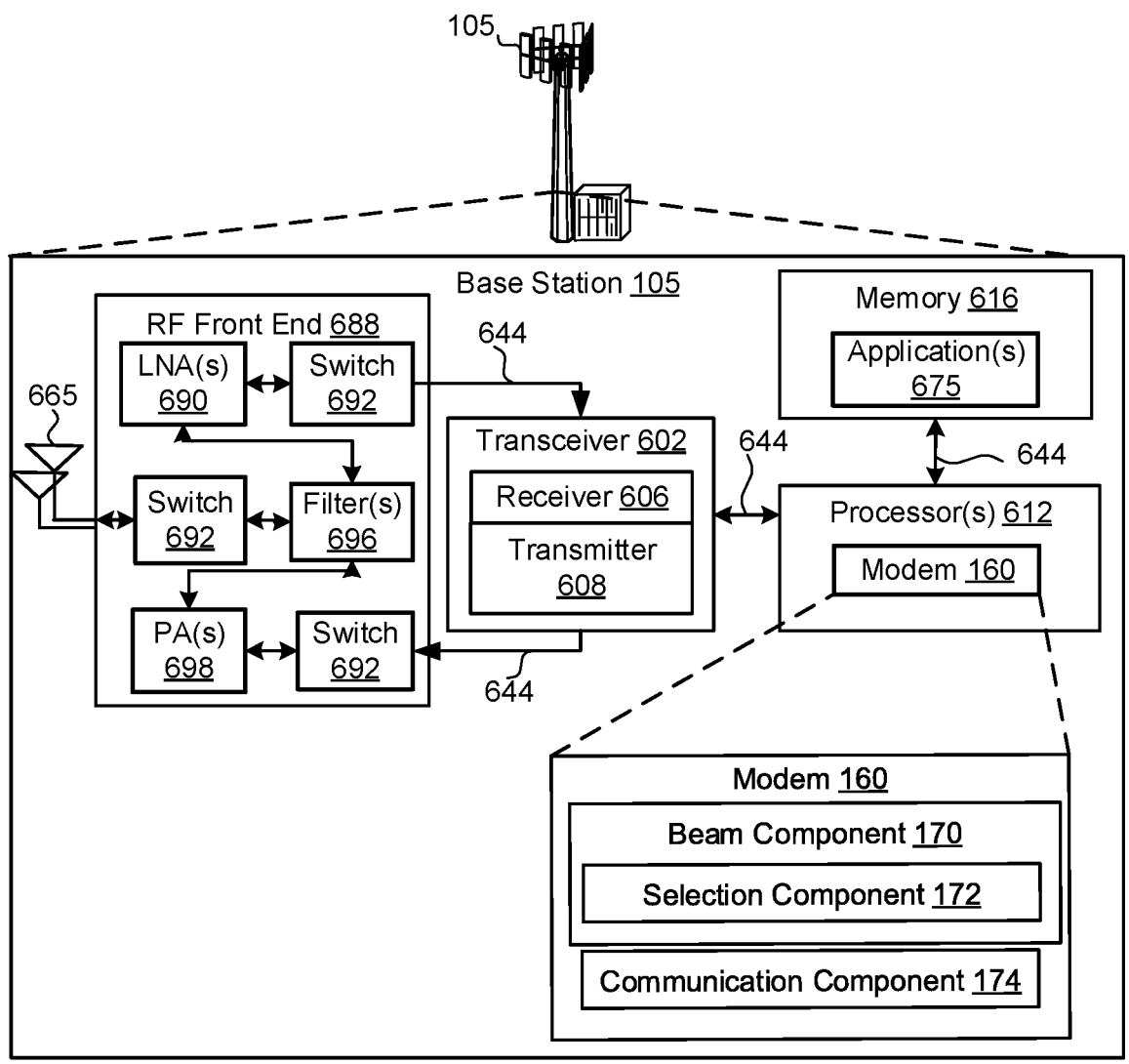
FIG. 6 is a schematic diagram of an example of a base station.

Referring to FIG. 6, one example of an implementation of the BS 105 may include a variety of components, some of which have already been described above, but including components such as one or more processors 612 and memory 616 and transceiver 602 in communication via one or more buses 644, which may operate in conjunction with modem 160 and the beam component 170 to enable one or more of the functions described herein related to the enhanced beam training. Further, the one or more processors 612, modem 160, memory 616, transceiver 602, RF front end 688 and the antenna system 665, may be configured to support voice and/or data calls (simultaneously or non-simultaneously) in one or more radio access technologies.

In an aspect, the one or more processors 612 may include a modem 160 that uses one or more modem processors. The various functions related to the beam component 170 may be included in modem 160 and/or processors 612 and, in an aspect, may be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 160 associated with the beam component 150 may be performed by transceiver 602.

Memory 616 may include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes defining the beam component 170 and/or one or more of the subcomponents, and/or data associated therewith, when BS 105 is operating at least one processor 612 to execute the beam component 170 and/or one or more of the subcomponents.

Transceiver 602 may include at least one receiver 606 and at least one transmitter 608. Receiver 606 may include hardware, firmware, and/or software code executable by a processor for receiving data, the code comprising instructions and being stored in a memory (e.g., computer-readable medium). Receiver 606 may be, for example, a radio frequency (RF) receiver. In an aspect, receiver 606 may receive signals transmitted by at least one base station 105. Additionally, receiver 606 may process such received signals, and also may obtain measurements of the signals, such as, but not limited to, Ec/Io, SNR, RSRP, RSSI, etc. Transmitter 608 may include hardware, firmware, and/or software code executable by a processor for transmitting data, the code comprising instructions and being stored in a memory (e.g., computer-readable medium). A suitable example of transmitter 508 may including, but is not limited to, an RF transmitter.

Moreover, in an aspect, BS 105 may include RF front end 688, which may operate in communication with the antenna system 665 and transceiver 602 for receiving and transmitting radio transmissions, for example, wireless communications transmitted by at least one UE 110 or wireless transmissions transmitted by other BS 105 and UE 110. RF front end 688 may be connected to the antenna system 665 and may include one or more low-noise amplifiers (LNAs) 690, one or more switches 692, one or more power amplifiers (PAs) 698, and one or more filters 696 for transmitting and receiving RF signals.

In an aspect, LNA 690 may amplify a received signal at a desired output level. In an aspect, each LNA 690 may have a specified minimum and maximum gain values. In an aspect, RF front end 688 may use one or more switches 692 to select a particular LNA 690 and its specified gain value based on a desired gain value for a particular application.

Further, for example, one or more PA(s) 698 may be used by RF front end 688 to amplify a signal for an RF output at a desired output power level. In an aspect, each PA 698 may have specified minimum and maximum gain values. In an aspect, RF front end 688 may use one or more switches 692 to select a particular PA 698 and its specified gain value based on a desired gain value for a particular application.

Also, for example, one or more filters 696 may be used by RF front end 688 to filter a received signal to obtain an input RF signal. Similarly, in an aspect, for example, a respective filter 696 may be used to filter an output from a respective PA 698 to produce an output signal for transmission. In an aspect, each filter 696 may be connected to a specific LNA 690 and/or PA 698. In an aspect, RF front end 688 may use one or more switches 692 to select a transmit or receive path using a specified filter 696, LNA 690, and/or PA 698, based on a configuration as specified by the transceiver 602 and/or processor 512.

As such, the transceiver 602 may be configured to transmit and receive wireless signals through the antenna system 665 via RF front end 688. In an aspect, transceiver may be tuned to operate at specified frequencies such that BS 105 may communicate with, for example, one or more UEs 110 or one or more cells associated with one or more base stations 105. In an aspect, for example, modem 160 may configure the transceiver 602 to operate at a specified frequency and power level based on the BS configuration of the BS 105 and the communication protocol used by modem 160.

In an aspect, modem 160 may be a multiband-multimode modem, which may process digital data and communicate with transceiver 602 such that the digital data is sent and received using transceiver 602. In an aspect, modem 160 may be multiband and be configured to support multiple frequency bands for a specific communications protocol. In an aspect, modem 160 may be multimode and be configured to support multiple operating networks and communications protocols. In an aspect, modem 160 may control one or more components of BS 105 (e.g., RF front end 688, transceiver 602) to enable transmission and/or reception of signals from the network based on a specified modem configuration. In an aspect, the modem configuration may be based on the mode of the modem and the frequency band in use. In another aspect, the modem configuration may be based on BS configuration information associated with BS 105 as provided by the network.

Figure 7:
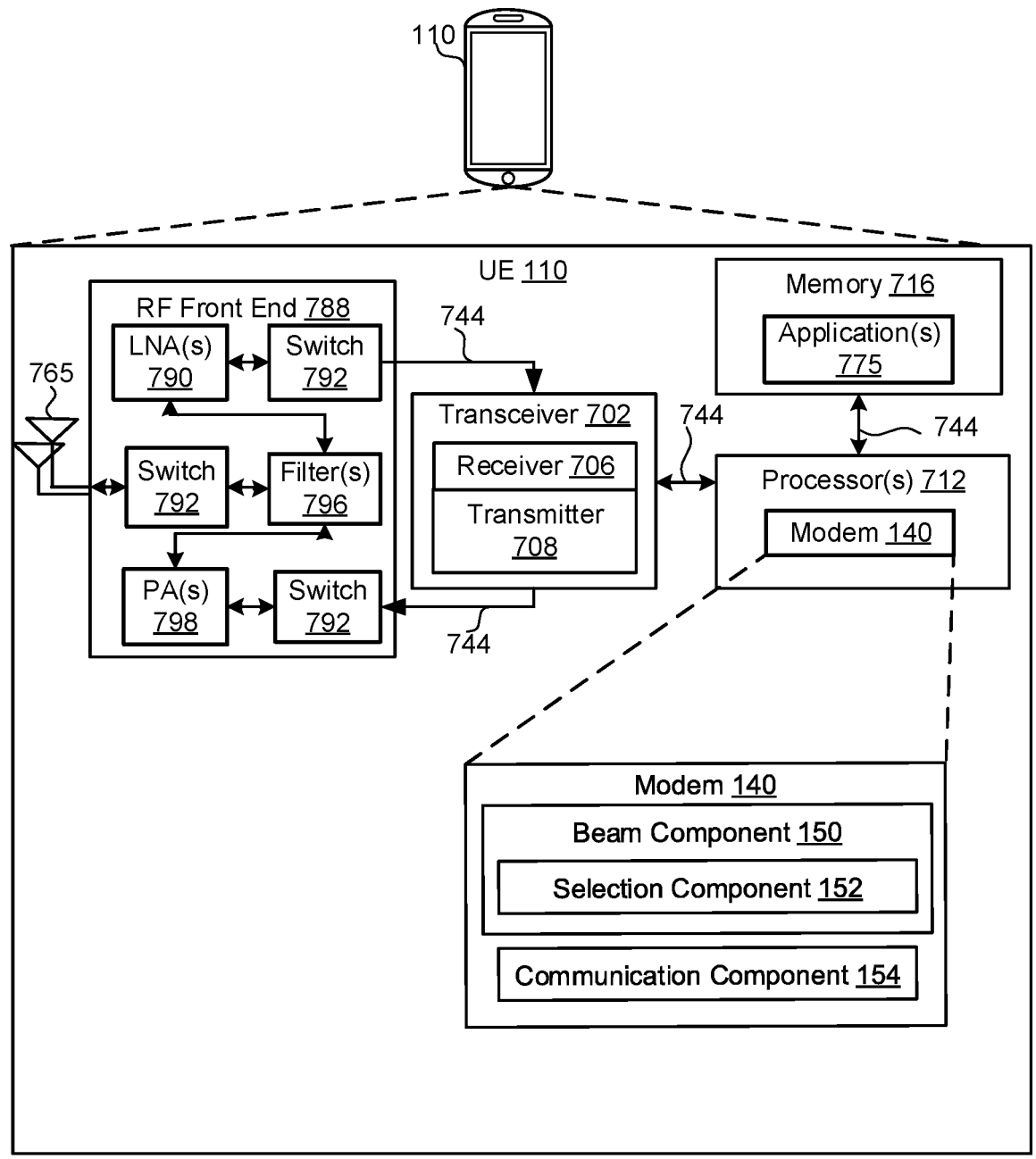
FIG. 7 is a schematic diagram of an example of a user equipment.

Referring to FIG. 7, one example of an implementation of the UE 110 may include a variety of components, some of which have already been described above in connection with FIG. 6, but including components such as one or more processors 712 and memory 716 and transceiver 702 in communication via one or more buses 744, which may operate in conjunction with modem 140 and the communication component 154 to enable one or more of the functions described herein related to the enhanced beam training procedure.

In an aspect, the one or more processors 712 may include a modem 140 that uses one or more modem processors. The various functions related to the beam component 150 may be included in modem 140 and/or processors 712 and, in an aspect, may be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with transceiver 702. In other aspects, some of the features of the one or more processors 712 and/or modem 140 associated with the beam component 150 may be performed by transceiver 702.

Memory 716 may include any type of computer-readable medium usable by a computer or at least one processor 712, such as random access memory (RAM), read only memory (ROM), tapes, magnetic discs, optical discs, volatile memory, non-volatile memory, and any combination thereof. In an aspect, for example, memory 716 may be a non-transitory computer-readable storage medium that stores one or more computer-executable codes defining the beam component 150 and/or one or more of the subcomponents, and/or data associated therewith, when UE 110 is operating at least one processor 712 to execute the beam component 150 and/or one or more of the subcomponents.

Transceiver 702 may include at least one receiver 706 and at least one transmitter 708. Receiver 706 may include hardware, firmware, and/or software code executable by a processor for receiving data, the code comprising instructions and being stored in a memory (e.g., computer-readable medium). Receiver 706 may be, for example, a radio frequency (RF) receiver. In an aspect, receiver 706 may receive signals transmitted by at least one BS 105 and/or UE 110. Additionally, receiver 706 may process such received signals, and also may obtain measurements of the signals, such as, but not limited to, Ec/Io, SNR, RSRP, RSSI, etc. Transmitter 708 may include hardware, firmware, and/or software code executable by a processor for transmitting data, the code comprising instructions and being stored in a memory (e.g., computer-readable medium). A suitable example of transmitter 708 may including, but is not limited to, an RF transmitter.

Moreover, in an aspect, UE 110 may include RF front end 788, which may operate in communication with the antenna system 765 and transceiver 702 for receiving and transmitting radio transmissions, for example, wireless communications transmitted by at least one BS 105 or wireless transmissions transmitted by other BS 105 and UE 110. RF front end 788 may be connected to the antenna system 765 and may include one or more low-noise amplifiers (LNAs) 790, one or more switches 792, one or more power amplifiers (PAs) 798, and one or more filters 796 for transmitting and receiving RF signals.

In an aspect, LNA 790 may amplify a received signal at a desired output level. In an aspect, each LNA 790 may have a specified minimum and maximum gain values. In an aspect, RF front end 788 may use one or more switches 792 to select a particular LNA 790 and its specified gain value based on a desired gain value for a particular application.

Further, for example, one or more PA(s) 798 may be used by RF front end 788 to amplify a signal for an RF output at a desired output power level. In an aspect, each PA 798 may have specified minimum and maximum gain values. In an aspect, RF front end 788 may use one or more switches 792 to select a particular PA 798 and its specified gain value based on a desired gain value for a particular application.

Also, for example, one or more filters 796 may be used by RF front end 788 to filter a received signal to obtain an input RF signal. Similarly, in an aspect, for example, a respective filter 796 may be used to filter an output from a respective PA 798 to produce an output signal for transmission. In an aspect, each filter 796 may be connected to a specific LNA 790 and/or PA 798. In an aspect, RF front end 788 may use one or more switches 792 to select a transmit or receive path using a specified filter 796, LNA 790, and/or PA 798, based on a configuration as specified by the transceiver 702 and/or processor 512.

As such, the transceiver 702 may be configured to transmit and receive wireless signals through the antenna system 765 via RF front end 788. In an aspect, transceiver may be tuned to operate at specified frequencies such that UE 110 may communicate with, for example, one or more UEs 110 or one or more cells associated with one or more BSs 105. In an aspect, for example, modem 140 may configure the transceiver 702 to operate at a specified frequency and power level based on the BS configuration of the UE 110 and the communication protocol used by modem 140.

In an aspect, modem 1460 may be a multiband-multimode modem, which may process digital data and communicate with transceiver 702 such that the digital data is sent and received using transceiver 702. In an aspect, modem 140 may be multiband and be configured to support multiple frequency bands for a specific communications protocol. In an aspect, modem 140 may be multimode and be configured to support multiple operating networks and communications protocols. In an aspect, modem 140 may control one or more components of UE 110 (e.g., RF front end 788, transceiver 702) to enable transmission and/or reception of signals from the network based on a specified modem configuration. In an aspect, the modem configuration may be based on the mode of the modem and the frequency band in use. In another aspect, the modem configuration may be based on BS configuration information associated with UE 110 as provided by the network.

Figure 8:
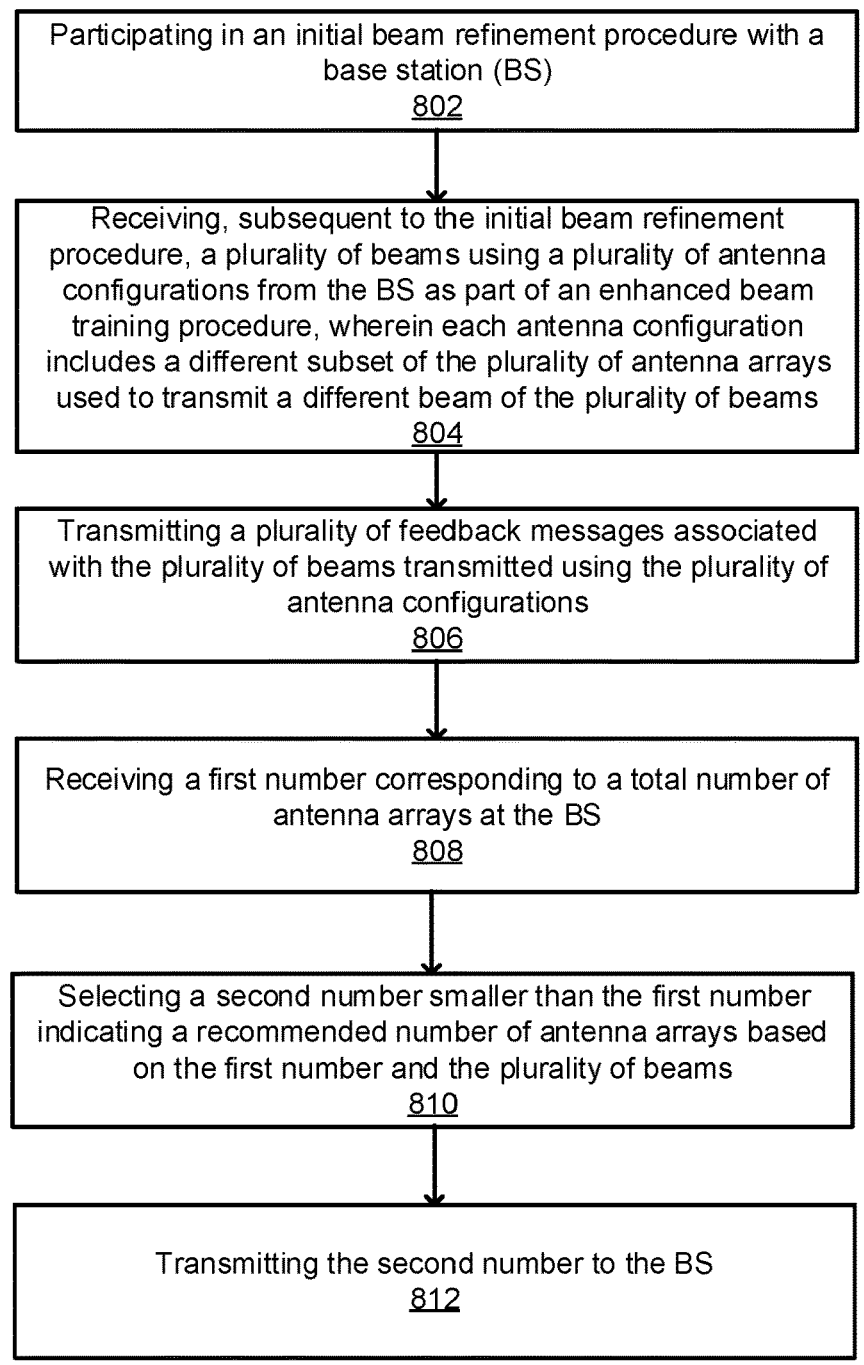
FIG. 8 is an example of a method for selecting an antenna configuration for the BS at the UE.

Referring to FIG. 8, a method 800 illustrates yet another enhanced beam training procedure. The method 800 may be an example method illustrating the fourth implementation of scenario 1 and/or the fourth technique. Specifically, the method 800 may perform the enhanced beam training iteratively with a device by receiving a number of available antennas from the a base station, and transmitting a recommended number of antenna used for communication.

At block 802, the method 800 may participate in an initial beam refinement procedure with a base station. For example, the beam component 150 of the UE 105 may participate in the initial beam refinement procedure with the BS 105. In a non-limiting example, the BS 105 may perform the initial beam refinement procedure using all of the antenna array (e.g., 64×16 antenna array). The antenna array may include all available antennas in the antenna system 665, in some examples. In other examples, the antenna system 665 may include a 16×4 array, a 32×4 array, a 32×8 array, a 64×4 array, a 64×8 array, or a 128×16 array. The initial beam refinement procedure may include three stages, e.g., P-1, P-2, and P-3 initial beam refinement procedures as identified in the 3GPP 5G NR standards. During the first stage, the BS 105 may send a number of beams to the beam component 150 of the UE 110. The beams may be sent with the same number of antenna arrays, such as the 64×16 array. The UE 110 may measure the data rate of the beams using the beam component 150 and send feedback information to the BS 105 using the communication component 154. During the second stage, the BS 105 may utilize the feedback information to select a beam for transmission. During the third stage, the UE 110 may use the transmission of the beams and the feedback information to determine, via the selection component 152, a beam configuration when sending information to the BS 105.

At block 804, the method 800 may receive, subsequent to the initial beam refinement procedure, a plurality of beams using a plurality of antenna configurations from the BS as part of an enhanced beam training procedure, wherein each antenna configuration includes a different subset of the plurality of antenna arrays used to transmit a different beam of the plurality of beams. For example, the beam component 150 of the UE 110 may receive, from the beam component 170 of the BS 105, a first beam using a 4×16 antenna array, a second beam using an 8×16 antenna array, a third beam using a 12×16 array, and a fourth beam using a 16×16 array. The antenna configurations may include any different number of antennas at the BS 105, for example, less than the total number of antennas in the antenna system 665. In some implementations, the UE 110 may first receive a notification from BS 105 the indicating the beginning of the enhanced beam training procedure. The notification may be embedded in a RRC bit, a DCI bit, a MAC-CE bit, or a multi-bit field. The BS 105 may transmit the beams using less than the total number of antennas in the antenna system 665 in order to search for a beam configuration that may maintain an optimum or acceptable data rate/SNR with reduced power consumption due to the reductions of antennas.

At block 806, the method 800 may transmit a plurality of feedback messages to the BS associated with the plurality of beams transmitted using the plurality of antenna configurations. For example, the communication component 154 may transmit feedback messages associated with the first, second, third, and fourth beams from the communication component 174 of the BS 105. The feedback messages may indicate the quality of transmission of the beams using different antenna configurations, such as the 4×16 array, the 8×16 array, the 12×16 array, and the 16×16 array. The quality of transmission may be measured using one or more of data rates, data losses, performance gains, or other suitable parameters. In some implementations, the feedback messages may each include one or more spectral efficiency metrics, one or more energy efficiency metrics, a reference signal received power, a received signal strength indicator, a signal-to-noise ratio, or a signal-to-interference-noise ratio. In certain non-limiting examples, the feedback messages may indicate that the data rates associated with the first, second, third, and fourth beams are 5 Gigabits per second (Gbps), 9.7 Gbps, 9.9 Gbps, and 10 Gbps, respectively.

At block 808, the method 800 may receive a first number corresponding to a total number of antenna arrays at the BS. For example, the communication component 154 may receive 64×16, or the number 1024, from the communication component 174 of the BS 105 indicating the number of antennas in the antenna system 665.

At block 810, the method 800 may select a second number smaller than the first number indicating a recommended number of antenna arrays based on the first number and the plurality of beams. For example, the selection component 152 may select the number 128, or 8×16, to the communication component 174 of the BS 105. Alternatively, the selection component 152 may select other numbers indicating a preferred antenna configuration by the UE 110. The UE 110 may utilize the selection component 152 to determine the number of antennas of the preferred antenna configuration. The UE 110 may select the number of antennas based on previous training data, the plurality of beams received (by the beam component 150) based on the plurality of antenna configurations, the quality of transmission (e.g., data rates, data losses, performance gains, a spectral efficiency metric, a reference signal received power, a received signal strength indicator, a signal-to-noise ratio, or a signal-to-interference-noise ratio), an internal look-up table, the data requirement of the UE 110, or other criteria.

At block 812, the method 800 may transmit the second number to the BS. For example, the communication component 154 may transmit the selected second number to the BS 105.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of antenna-array size adaptation at a base station (B S), comprising:

performing beam refinement procedure using antenna arrays with one or more devices;

transmitting a notification indicating initiation of an enhanced beam training procedure;

performing the enhanced beam training procedure, wherein performing the enhanced beam training procedure comprises:

transmitting, subsequent to the beam refinement procedure, a plurality of beams using a plurality of antenna configurations to the one or more devices, wherein the plurality of antenna configurations includes an initial antenna configuration and a subsequent antenna configuration, wherein the initial antenna configuration indicates an initial subset of the antenna arrays used to transmit an initial beam of the plurality of beams and the subsequent antenna configuration indicates a subsequent subset of the antenna arrays used to transmit a subsequent beam of the plurality of beams, wherein the initial subset of the antenna arrays is different from the second subsequent subset of the antenna arrays;

receiving, from the one or more devices, an initial feedback message associated with the initial beam and a subsequent feedback message associated with the subsequent beam;

selecting the subsequent antenna configuration, wherein a difference in an initial quality of the initial beam and a subsequent quality of the subsequent beam is between a first threshold and a second threshold; and communicating with the one or more devices using the selected subsequent subset of the antenna arrays.

2. The method of claim 1, wherein the notification is embedded in a radio resource control bit, a downlink control information bit, a medium access control element bit, or a multi-bit field.

3. The method of claim 1, wherein each of the initial and subsequent feedback messages includes a plurality of spectral efficiency metrics.

4. The method of claim 3, wherein selecting the subsequent antenna configuration further includes selecting the subsequent antenna configuration based on the plurality of spectral efficiency metrics or a plurality of energy efficiency metrics.

5. The method of claim 4, wherein the plurality of spectral efficiency metrics indicate rates of transmission using the plurality of antenna configurations and the plurality of energy efficiency metrics indicate power consumptions associated with the transmission of the plurality of beams.

6. The method of claim 1, wherein each of the initial and subsequent feedback messages includes one or more of a reference signal received power, a received signal strength indicator, a signal-to-noise ratio, or a signal-to-interference-noise ratio.

7. The method of claim 6, wherein selecting the subsequent antenna configuration further includes selecting the subsequent antenna configuration based on a plurality of energy efficiency metrics.

8. The method of claim 1, wherein:
the subsequent feedback message includes information relating to channel condition; and
selecting the subsequent antenna configuration further includes selecting the subsequent antenna configuration when the BS detects a change in the channel condition.

9. The method of claim 1, wherein the one or more devices include a user equipment or another base station.

10. The method of claim 1, wherein performing the enhanced beam training procedure comprises iteratively analyzing differences in the initial quality of the initial beam and qualities of the plurality of beams before selecting the subsequent antenna configuration.

11. A base station (BS), comprising:
a memory;
a transceiver; and
a processor configured to:
perform beam refinement procedure using antenna arrays with one or more devices;
transmit, via the transceiver, a notification indicating initiation of an enhanced beam training procedure;
perform the enhanced beam training procedure, wherein, to perform the enhanced beam training procedure, the processor is further configured to:
transmit, via the transceiver, subsequent to the beam refinement procedure, a plurality of beams using a plurality of antenna configurations to the one or more devices, wherein the plurality of antenna configurations includes an initial antenna configuration and a subsequent antenna configuration, wherein the initial antenna configuration indicates an initial subset of the antenna arrays used to transmit an initial beam of the plurality of beams and the subsequent antenna configuration indicates a subsequent subset of the antenna arrays used to transmit a subsequent beam of the plurality of beams, wherein the initial subset of the antenna arrays is different from the subsequent subset of the antenna arrays;
receive, via the transceiver, from the one or more devices, an initial feedback message associated with the initial beam and a subsequent feedback message associated with the subsequent beam;
select the subsequent antenna configuration, wherein a difference in an initial quality of the initial beam and a subsequent quality of the subsequent beam is between a first threshold and a second threshold; and
communicate, via the transceiver, with the one or more devices using the selected subsequent subset of the antenna arrays.

12. The base station of claim 11, wherein the notification is embedded in a radio resource control bit, a downlink control information bit, a medium access control element bit, or a multi-bit field.

13. The base station of claim 11, wherein each of the initial and subsequent feedback messages includes a plurality of spectral efficiency metrics.

14. The base station of claim 13, wherein the processor is further configured to select the subsequent antenna configuration based on the plurality of spectral efficiency metrics or a plurality of energy efficiency metrics.

15. The base station of claim 14, wherein the plurality of spectral efficiency metrics indicate rates of transmission using the plurality of antenna configurations and the plurality of energy efficiency metrics indicate power consumptions associated with the transmission of the plurality of beams.

16. The base station of claim 11, wherein each of the initial and subsequent feedback messages includes one or more of a reference signal received power, a received signal strength indicator, a signal-to-noise ratio, or a signal-to-interference-noise ratio.

17. The base station of claim 16, wherein the processor is further configured to select the subsequent antenna configuration based on a plurality of energy efficiency metrics.

18. The base station of claim 11, wherein:
the subsequent feedback message includes information relating to channel condition; and
the processor is further configured to select the subsequent antenna configuration when the BS detects a change in the channel condition.

19. The base station of claim 11, wherein the one or more devices include a user equipment or another base station.

20. A computer-readable medium having instructions stored therein that, when executed by one or more processors of a base station (BS), cause the one or more processors to:
perform beam refinement procedure using antenna arrays with one or more devices;
transmit, via a transceiver, a notification indicating initiation of an enhanced beam training procedure;
perform the enhanced beam training procedure, wherein, to perform the enhanced beam training procedure, the instructions cause the one or more processor to:
transmit, via the transceiver, subsequent to the beam refinement procedure, a plurality of beams using a plurality of antenna configurations to the one or more devices, wherein the plurality of antenna configurations includes an initial antenna configuration and a subsequent antenna configuration, wherein the initial antenna configuration indicates an initial subset of the antenna arrays used to transmit an initial beam of the plurality of beams and the subsequent antenna configuration indicates a subsequent subset of the antenna arrays used to transmit a second beam of the plurality of beams, wherein the initial subset of the antenna arrays is different from the subsequent subset of the antenna arrays;
receive, via the transceiver, from the one or more devices, an initial feedback message associated with the initial beam and a subsequent feedback message associated with a subsequent beam;
select the subsequent antenna configuration, wherein a difference in an initial quality of the initial beam and a subsequent quality of the subsequent beam is between a first threshold and a second threshold; and
communicate, via the transceiver, with the one or more devices using the selected subsequent subset of the antenna arrays.

21. The computer-readable medium of claim 20, wherein the notification is embedded in a radio resource control bit, a downlink control information bit, a medium access control element bit, or a multi-bit field.

22. The computer-readable medium of claim 20, wherein each of the initial and subsequent feedback messages includes a plurality of spectral efficiency metrics.

23. The computer-readable medium of claim 22, wherein the instructions cause the one or more processors to select the subsequent antenna configuration based on the plurality of spectral efficiency metrics or a plurality of energy efficiency metrics.

24. The computer-readable medium of claim 23, wherein the plurality of spectral efficiency metrics indicate rates of transmission using the plurality of antenna configurations and the plurality of energy efficiency metrics indicate power consumptions associated with the transmission of the plurality of beams.

25. The computer-readable medium of claim 20, wherein each of the initial and subsequent feedback messages includes one or more of a reference signal received power, a received signal strength indicator, a signal-to-noise ratio, or a signal-to-interference-noise ratio.

26. The computer-readable medium of claim 24, wherein the instructions cause the one or more processor to select the subsequent antenna configuration based on a plurality of energy efficiency metrics.

27. The computer-readable medium of claim 20, wherein:
the subsequent feedback message includes information relating to channel condition; and
the instructions cause the one or more processor to select the subsequent antenna configuration when the BS detects a change in the channel condition.

28. The computer-readable medium of claim 20, wherein the one or more devices include a user equipment or another base station.

29. A user equipment (UE), comprising: a memory;
a transceiver; and
a processor configured to:
participate in a beam refinement procedure with a base station (BS);
participate in an enhanced beam training procedure, wherein, to participate in the enhanced beam training procedure, the processor is further configured to:
receive, via the transceiver and subsequent to the beam refinement procedure, a plurality of beams using a plurality of antenna configurations from the BS, wherein the plurality of antenna configurations includes an initial antenna configuration and a subsequent antenna configuration, wherein the initial antenna configuration indicates an initial subset of antenna arrays used to transmit an initial beam of the plurality of beams and the subsequent antenna configuration indicates a subsequent subset of the antenna arrays used to transmit a subsequent beam of the plurality of beams, wherein a quality difference in an initial quality of the initial beam and a subsequent quality of the subsequent beam is between a first threshold and a second threshold;
transmit, via the transceiver, an initial feedback message associated with the initial beam and a subsequent feedback message associated with the subsequent beam;
receive, via the transceiver, a first number corresponding to a total number of antenna arrays at the BS; and
select a second number smaller than the first number indicating a recommended number of antenna arrays based on the first number and the plurality of beams, wherein the selection is based on an internal look-up table; and
transmit the second number to the BS.

30. The UE of claim 29, wherein the processor is further configured to receive a notification indicating initiation of the enhanced beam training procedure.

31. The UE of claim 30, wherein the notification is embedded in a radio resource control bit, a downlink control information bit, a medium access control element bit, or a multi-bit field.

32. The UE of claim 29, wherein each of the initial and subsequent feedback messages includes a plurality of spectral efficiency metrics or a plurality of energy efficiency metrics.

33. The UE of claim 32, wherein the plurality of spectral efficiency metrics indicate rates of transmission using the plurality of antenna configurations and the plurality of energy efficiency metrics indicate power consumptions associated with the transmission of the plurality of beams.

34. The UE of claim 29, wherein each of the initial and subsequent feedback messages includes a reference signal received power, a received signal strength indicator, a signal-to-noise ratio, or a signal-to-interference-noise ratio.

* * * * *